United States Patent
Iwasaki (10) Patent No.: US 10,016,676 B2
(45) Date of Patent: Jul. 10, 2018

(54) PROCESSING SYSTEM, INFORMATION PROCESSING APPARATUS, CONTROL METHOD, PROGRAM AND STORAGE MEDIUM

(71) Applicant: SQUARE ENIX HOLDINGS CO., LTD., Tokyo (JP)

(72) Inventor: Tetsuji Iwasaki, Montreal (CA)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 564 days.

(21) Appl. No.: 14/407,094

(22) PCT Filed: Jun. 4, 2013

(86) PCT No.: PCT/JP2013/065903
§ 371 (c)(1),
(2) Date: Dec. 11, 2014

(87) PCT Pub. No.: WO2013/191016
PCT Pub. Date: Dec. 27, 2013

(65) Prior Publication Data
US 2015/0113035 A1  Apr. 23, 2015

Related U.S. Application Data

(60) Provisional application No. 61/664,313, filed on Jun. 26, 2012, provisional application No. 61/661,499, filed on Jun. 19, 2012.

(30) Foreign Application Priority Data

Aug. 22, 2012 (JP) ................................ 2012-183575

(51) Int. Cl.
*G06F 9/54* (2006.01)
*A63F 13/355* (2014.01)

(52) U.S. Cl.
CPC ............ *A63F 13/355* (2014.09); *G06F 9/547* (2013.01); *A63F 2300/538* (2013.01); *A63F 2300/807* (2013.01)

(58) Field of Classification Search
None
See application file for complete search history.

(56) References Cited

U.S. PATENT DOCUMENTS 6,249,822 B1  6/2001  Kays, Jr. et al.
6,678,742 B1  1/2004  Muramatsu et al.
(Continued)

FOREIGN PATENT DOCUMENTS

JP  2000-293375  10/2000
JP  2004-348664  12/2004
(Continued)

OTHER PUBLICATIONS

Extended European Search Report from European Patent Office (EPO) in European Patent Appl. No. 13806610.5, dated Jul. 27, 2016.
(Continued)

*Primary Examiner* — Angela Nguyen
(74) *Attorney, Agent, or Firm* — Greenblum & Bernstein, P.L.C.

(57) ABSTRACT

A first device generates, associates with a generated call, and transmits generation information for generating an object corresponding to identification information included in the call. On the other side, in a case where the received call includes unknown identification information, a second device generates and stores an object corresponding to unknown identification information based on generation information associated with the call. Next, the second device associates the unknown identification information with
(Continued)

| CLIENT HANDLER TABLE ||
| HANDLER | POINTER |
|---|---|
| 1 | pObject1 on client |
| 2 | pObject2 on client |
| 3 | pObject3 on client |
| ⋮ | ⋮ |
| n | pObject(n) on client | specification information that specifies the stored object in a memory space of the device and register that.

10 Claims, 8 Drawing Sheets

(56) References Cited

U.S. PATENT DOCUMENTS

| | | | |
|---|---|---|---|
| 8,386,584 | B2 | 2/2013 | Yoshikawa |
| 2002/0046260 | A1* | 4/2002 | Day, II .................... H04L 29/06 709/219 |
| 2010/0235523 | A1* | 9/2010 | Garcia ................ H04L 12/1822 709/228 |
| 2011/0047255 | A1 | 2/2011 | Yoshikawa |

FOREIGN PATENT DOCUMENTS

| | | |
|---|---|---|
| JP | 2011-039981 | 2/2011 |
| JP | 2011-118867 | 6/2011 |
| WO | 2009/138878 | 11/2009 |

OTHER PUBLICATIONS

Office Action from Japan Patent Office (JPO) in Japanese Patent Appl. No. 2012-183575, dated Jun. 17, 2016.
International Search Report (ISR) in International Patent Application No. PCT/JP2013/065903, dated Jul. 9, 2013.

* cited by examiner

| CLIENT HANDLER TABLE | |
|---|---|
| HANDLER | POINTER |
| 1 | pObject1 on client |
| 2 | pObject2 on client |
| 3 | pObject3 on client |
| ⋮ | ⋮ |
| n | pObject(n) on client |

FIG. 4B

| SERVER HANDLER TABLE | |
|---|---|
| HANDLER | POINTER |
| 1 | pObject1 on server |
| 2 | pObject2 on server |
| 3 | pObject3 on server |
| ⋮ | ⋮ |
| n | pObject(n) on server |

PROCESSING SYSTEM, INFORMATION PROCESSING APPARATUS, CONTROL METHOD, PROGRAM AND STORAGE MEDIUM

CLAIM FOR PRIORITY

This application is a U.S. National Stage of PCT/JP2013/065903 filed on Jun. 4, 2013, and claims the priority benefit of U.S. provisional application 61/661,499, filed Jun. 19, 2012; U.S. provisional application 61/664,313, filed Jun. 26, 2012; and Japanese application 2012-183575, filed Aug. 22, 2012, the contents of which is expressly incorporated by reference herein in their entireties.

TECHNICAL FIELD

The present invention relates to a processing system, an information processing apparatus, a control method, a program and a storage medium, and particularly to a technique of realizing processing over multiple devices.

BACKGROUND ART

Client devices such as personal computers (PCs) capable of network connection have become widespread. Along with the widespread use of devices, the network population of the Internet is increasing. Various services using the Internet have recently been developed for network users, and entertainment services such as games are also provided.

One of the services for network users is a multiuser online network game such as MMORPG (Massively Multiplayer Online Role-Playing Game). In a multiuser online network game, a user connects his/her client device to a server that provides the game, thereby doing match-up play or team play with another user who uses another client device connected to the server.

In a general multiuser online network game, each client device sends/receives data necessary for game rendering to/from the server. The client device performs rendering processing using the received data necessary for rendering and presents the generated game screen to a display device connected to the client device, thereby providing the game screen to the user. Information the user has input by operating an input interface is sent to the server and used for calculation processing in the server or transmitted to another client device connected to the server.

However, some network games that cause a client device to perform rendering processing require a user to use a PC having sufficient rendering performance or a dedicated game device. For this reason, the number of users of a network game (one content) depends on the performance of the client device required by the content. A high-performance device is expensive, as a matter of course, and the number of users who can own the device is limited. That is, it is difficult to increase the number of users of a game that requires high rendering performance, for example, a game that provides beautiful graphics.

In recent years, however, there are also provided games playable by a user without depending on the processing capability, such as rendering performance, of a client device. In a game such as is described in International Publication No. 2009/138878, a server acquires the information of an operation caused in a client device and provides, to the client device, a game screen obtained by performing rendering processing using the information.

In a case where a server performs rendering processing such as in the previously described International Publication No. 2009/138878, for example, an embodiment is considered in which main processing excluding rendering processing is performed on a client device, and processing concerning rendering is caused to be processed by a server. Specifically, the client device can acquire a game screen by using a rendering capability that the server provides as needed in the course of the main processing.

As one form of achieving this kind of embodiment, a method may be considered in which a function concerning rendering processing that the server provides is used by calling the function in the main processing of the client device. However, a method of providing to a function a handler including a pointer to an object as a callback as with a conventional callback function could not be used across different devices as in the game system of International Publication No. 2009/138878. This is because each device uses an independent memory space, and a pointer to an object in one device's memory space cannot be used in the memory space of another device.

SUMMARY OF INVENTION

The present invention was made in view of such problems in the conventional technique. The present invention provides a processing system, an information processing apparatus, a control method, a program and a storage medium that realize execution of processing due to a call that spans devices.

The present invention in its first aspect provides a processing system in which a first device generates a call corresponding to a function provided by a second device which is different from the first device, and causes the second device to execute processing corresponding to the function, wherein the first device comprises: allocation means for allocating identification information, that is for the processing system, for specification information that specifies an object stored in the first memory; call transmission means for generating and transmitting to the second device a call including identification information allocated by the allocation means; and information transmission means for generating, associating with the call and transmitting generation information for generating an object corresponding to identification information included in the call; and wherein the second device comprises: a second memory for storing an object; receiving means for receiving the call or the generation information; and registration means for, in a case where unknown identification information is included in a call received by the receiving means, generating based on generation information associated with the call, and storing in the second memory, an object corresponding to the unknown identification information, associating with specification information that specifies an object corresponding to the unknown identification information, and registering, the unknown identification information.

The present invention in its second aspect provides an information processing apparatus that executes processing corresponding to the function in accordance with having received a call for a function that the information processing apparatus provides from another device, the information processing apparatus comprising: a memory for storing an object; receiving means for receiving from the other device a call including identification information allocated for specification information that specifies an object that the other device retains in the other device and generation information for generating an object corresponding to identification information included in the call; and registration means for, in a case where unknown identification information is included in a call received by the receiving means, generating based on the generation information, and storing in the memory, an object corresponding to the unknown identification information, and associating with specification information that specifies an object corresponding to the unknown identification information, and registering, the unknown identification information.

The present invention in its third aspect provides a control method of an information processing apparatus that executes processing corresponding to a function that the information processing apparatus provides in accordance with having received a call for the function from another device, the control method comprising: a receiving step that receiving means of the information processing apparatus receives from the other device a call including identification information allocated for specification information that specifies an object that the other device retains in the other device and generation information for generating an object corresponding to identification information included in the call; and a registration step that registration means of the information processing apparatus, in a case where unknown identification information is included in a call received in the receiving step, generates based on the generation information, and stores in the memory, an object corresponding to the unknown identification information, and associates with specification information that specifies an object corresponding to the unknown identification information, and registers, the unknown identification information.

Further features of the present invention will become apparent from the following description of exemplary embodiments (with reference to the attached drawings).

DESCRIPTION OF EMBODIMENTS

First Embodiment

Below, for the explanatory embodiments of the present invention, detailed explanation is given referring to the drawings. Note, the first embodiment, which is explained below, is an example of a processing system, and will be explained as an example in which a game system comprising a client terminal 100 functioning as the user operated first device and a server 200 functioning as the game content screen distributing second device is applied to the present invention.

<Game System Configuration>

Figure 1A:
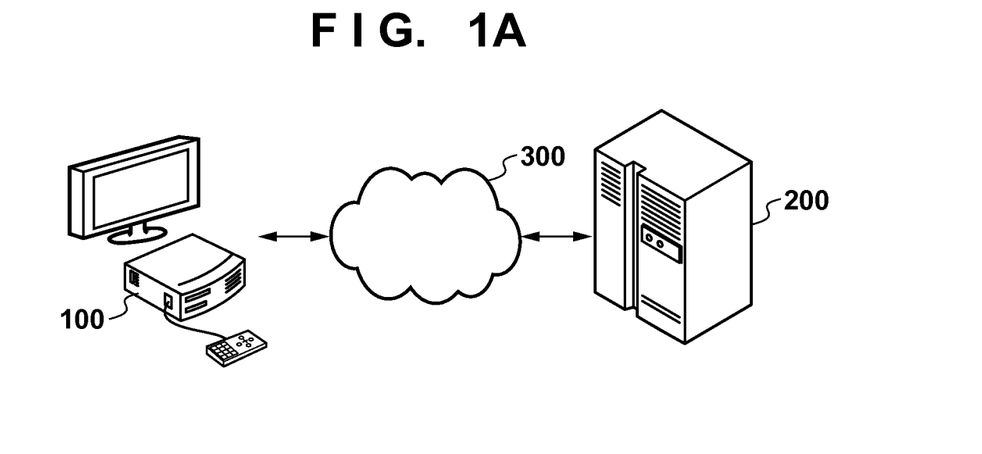
FIG. 1A is view for showing a system configuration of a game system according to a first embodiment of the present invention.

FIG. 1A is view for showing a system configuration of a game system according to a first embodiment of the present invention.

As shown in the drawing, the client terminal 100 and the server 200 are connected via a network 300. In the game system of the present embodiment the server 200 receives a processing instruction concerning screen generation of provided game contents from the client terminal 100 and performs processing corresponding to the instruction. Next the server 200 distributes by streaming the generated screen as encoded video data to the client terminal 100.

In the present embodiment, explanation is given with the client terminal 100 assumed to be a home-use game console for performing processing other than processing concerning the rendering system, but implementation of the present invention is not limited to this. The client terminal 100 may be any device that can cause the server 200 to perform a function by generating a call to a capability (function) that the server 200 provides such as a PC, a portable game device, and mobile phone, a PDA, a tablet or the like.

In the present embodiment, the server 200 performs processing concerning the rendering system instead of performance on the client terminal 100. Here the client terminal 100 functions as a master that makes a processing command and the server 200 functions as a slave that provides a game content rendering capability corresponding to the processing command. Note, in the present embodiment, the server 200 is explained as something that provides a rendering capability, but the present invention is not limited to this kind of rendering capability and it should be understood that other application is possible. Also, in the present embodiment, explanation is given with the second device being the server 200, but the second device is not limited to being a server and it may be any device that can receive the call for performance of the provided capability.

<Client Terminal 100 Configuration>

Figure 2:
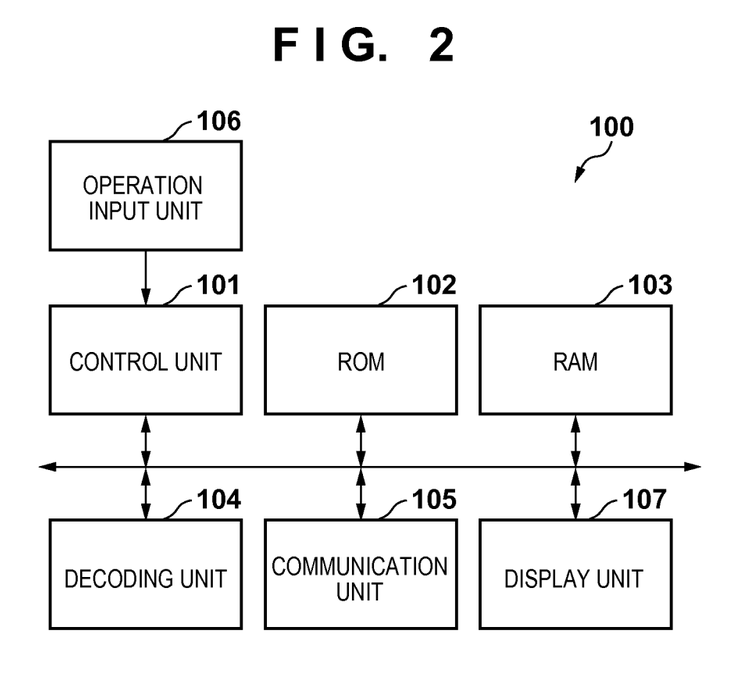
FIG. 2 is a block diagram for showing a functional configuration of a client terminal 100 according to embodiments of the present invention.

FIG. 2 is a block diagram for showing a functional configuration of the client terminal 100 according to embodiments of the present invention.

A control unit 101 is, for example, a CPU. The control unit 101 controls the operation of each block of the client terminal 100. Specifically, the control unit 101 controls operation of each block by reading out operation programs for each block stored in a ROM 102, loading them into a RAM 103 and executing them.

The ROM 102 is, for example, a rewriteable non-volatile memory. The ROM 102, in addition to the operation programs of each block of the client terminal 100, also stores information such as parameters necessary for the operation of the blocks.

The RAM 103 is a volatile memory. The RAM 103 functions not only as a load area for operation programs of each of the blocks of the client terminal 100, but also as a storage area for such things as intermediate data output in the operation of each block. Also, in the present embodiment, each type of object used in the operation of each block is stored in the RAM 103. The various types of objects may be specific structures that are allocated in a program such as, for example, parameters that show the state of user operation target characters.

Figure 4A:
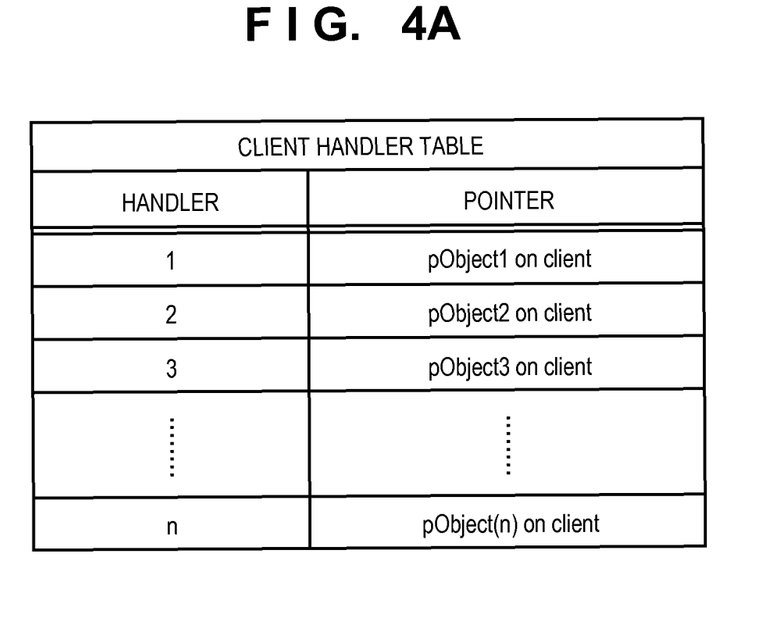
FIGS. 4A and 4B are views for illustrating a handler table of each device according to embodiments of the present invention.

Also, in the present embodiment, a client handler table that manages handlers that are included in a call of a function (provided function) corresponding to a capability that the server 200 provides is stored in the RAM 103. Specifically, the client handler table manages a correspondence between handlers included in the calls, and pointers of the various types of objects stored in the RAM 103. For example, in a case where a provided function is defined to be:

InitialisationMethod(Data, &pObject1, &pObject2, &pObject3)

it is necessary to pass three types of instances in addition to data (Data) in order to execute the function. Here, each instance is a pointer that indicates an object in RAM 103, and because the memory spaces are different between the client terminal 100 and the server 200 as described above, in the server 200 the pointer is not correctly interpreted. Consequently, in the present embodiment, for a pointer included as an instance of a provided function, a handler that uniquely specifies the pointer is allocated, and this handler is included in a call and transmitted. As shown in FIG. 4A, in the client handler table, a pointer used as a instance and a handler allocated for the pointer are associated and managed.

A decoding unit 104 decodes encoded video data received from the server 200, and generates screens to provide to a later described display unit 107. Note, in the present embodiment explanation is given having the client terminal 100 be something that receives a game content screen in the form of encoded video data from the server 200, but the received data is obviously not limited to this data form.

A communication unit 105 is a communication interface of the client terminal 100. The client terminal 100 can connect to the server 200 over the network 300 via the communication unit 105, and can perform data communication according to a defined protocol.

An operation input unit 106 is a user interface of the client terminal 100 such as, for example, an operation button or a touch panel. When the operation input unit 106 detects operation input from the user, control signals corresponding to the operation input are output to the control unit 101.

The display unit 107 is a display apparatus of the client terminal 100 such as an LCD, for example. A game content screen received from the server 200 is provided to a user by being presented on the display unit 107.

<Server 200 Configuration>

Figure 3:
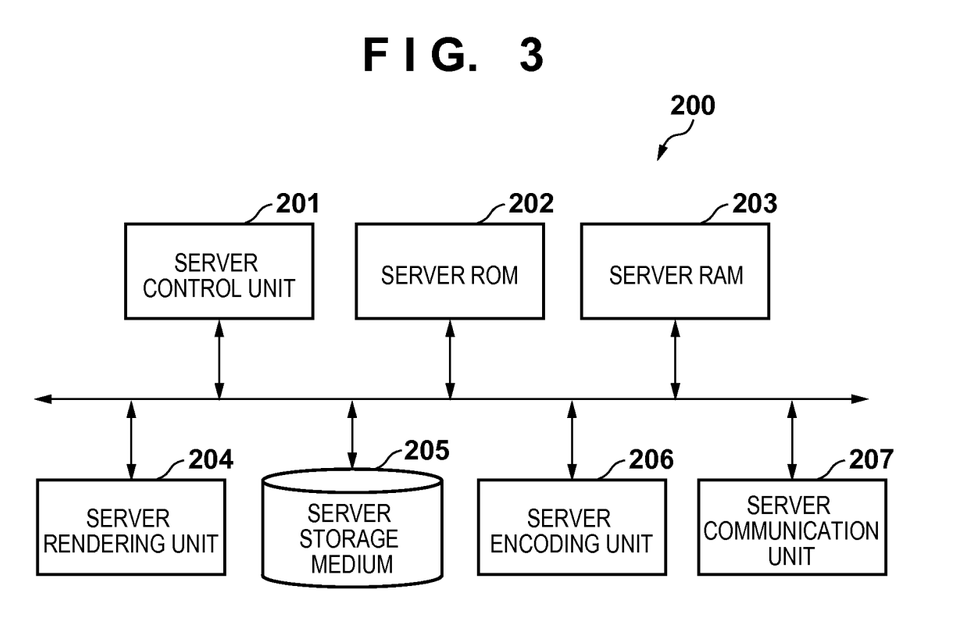
FIG. 3 is a block diagram for showing a functional configuration of a server 200 according to embodiments of the present invention.

FIG. 3 is a block diagram for showing a functional configuration of the server 200 according to embodiments of the present invention.

A server control unit 201 is, for example, a CPU, and it controls the operation of each block of the server 200. Specifically, the server control unit 201 controls the operation of each block stored in a server ROM 202 by reading out an operation program of the block, loading it into a server RAM 203, and executing it.

The server ROM 202 is, for example, a rewritable, non-volatile memory. The server ROM 202, in addition to the operation programs of each block of the server 200, also stores information such as parameters necessary for the operation of the blocks. Also, in the server ROM 202 account information of users of services that the server 200 provides is managed. A user of the client terminal 100 can receive the provision of screens that correspond to progress status on the terminal by performing a service login to the server 200 using the account information when using the game content.

The server RAM 203 is a volatile memory. The server RAM 203 functions not only as a load area for operation programs of each of the blocks of the server 200, but also as a storage area for such things as intermediate data output in the operation of each block. Also, in the present embodiment, each type of object used in the operation of each block is stored in the server RAM 203. Some of the various types of objects correspond to objects stored in the RAM 103 of the client terminal 100.

Figure 4B:
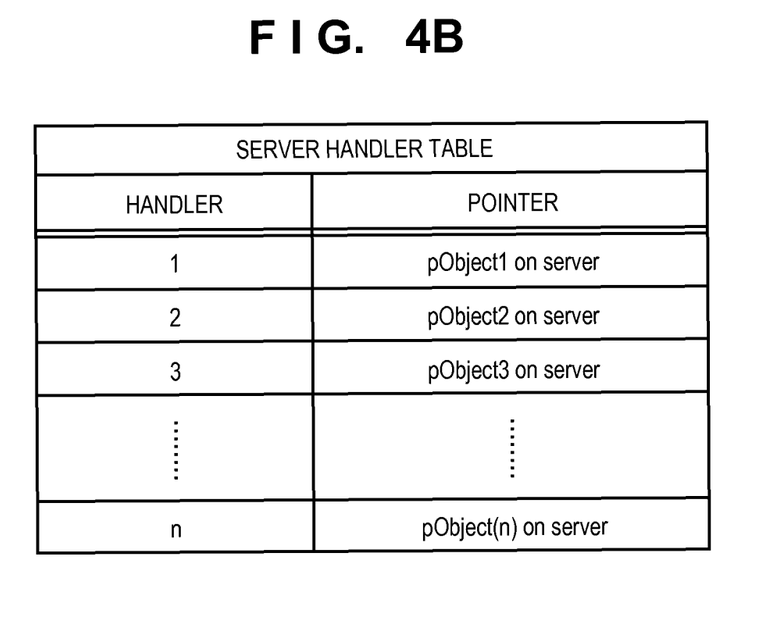

Also, in the server RAM 203, a server handler table that manages handlers that are included in a call of a provided function. Specifically, the server handler table manages a correspondence between handlers included in the calls, and pointers of objects stored in the server RAM 203 corresponding to these handlers. The server handler table, as shown in FIG. 4B, associates with pointers to corresponding objects in the server RAM 203 and manages handlers allocated in the client terminal 100. Note, there is generally a 1 to 1 correspondence between the server handler table and the client handler table. In other words, on the client terminal 100 and the server 200 for common handlers, pointers to corresponding objects in each memory space are managed using tables.

A server rendering unit 204 is, for example, a GPU, and it renders game screens for game content of a provided service. For example, in a case where content in which a 3 dimensional scenes are provided as game screens, the server rendering unit 204 receives information of a rendering object included in a rendering scope from the server control unit 201, and generates game screens rendering to a VRAM (not shown) in order. Note, such things as model data and texture data used in game screen generation are stored in a server storage medium 205.

A server encoding unit 206 generates encoded video data by encoding game screens generated by the server rendering unit 204. In the present embodiment a game screen provided from the server 200 to the client terminal 100 is transmitted as a frame of encoded video data of a predetermined format.

A server communication unit 207 is a communication interface of the server 200. The server 200 can connect to servers 200 over the network 300 via the server communication unit 207, and can perform data communication according to a defined protocol. In the present embodiment the server 200 transmits encoded video data generated in the server encoding unit 206 using a streaming format to the client terminal 100.

<Handler Table Update Operation>

Figure 5:
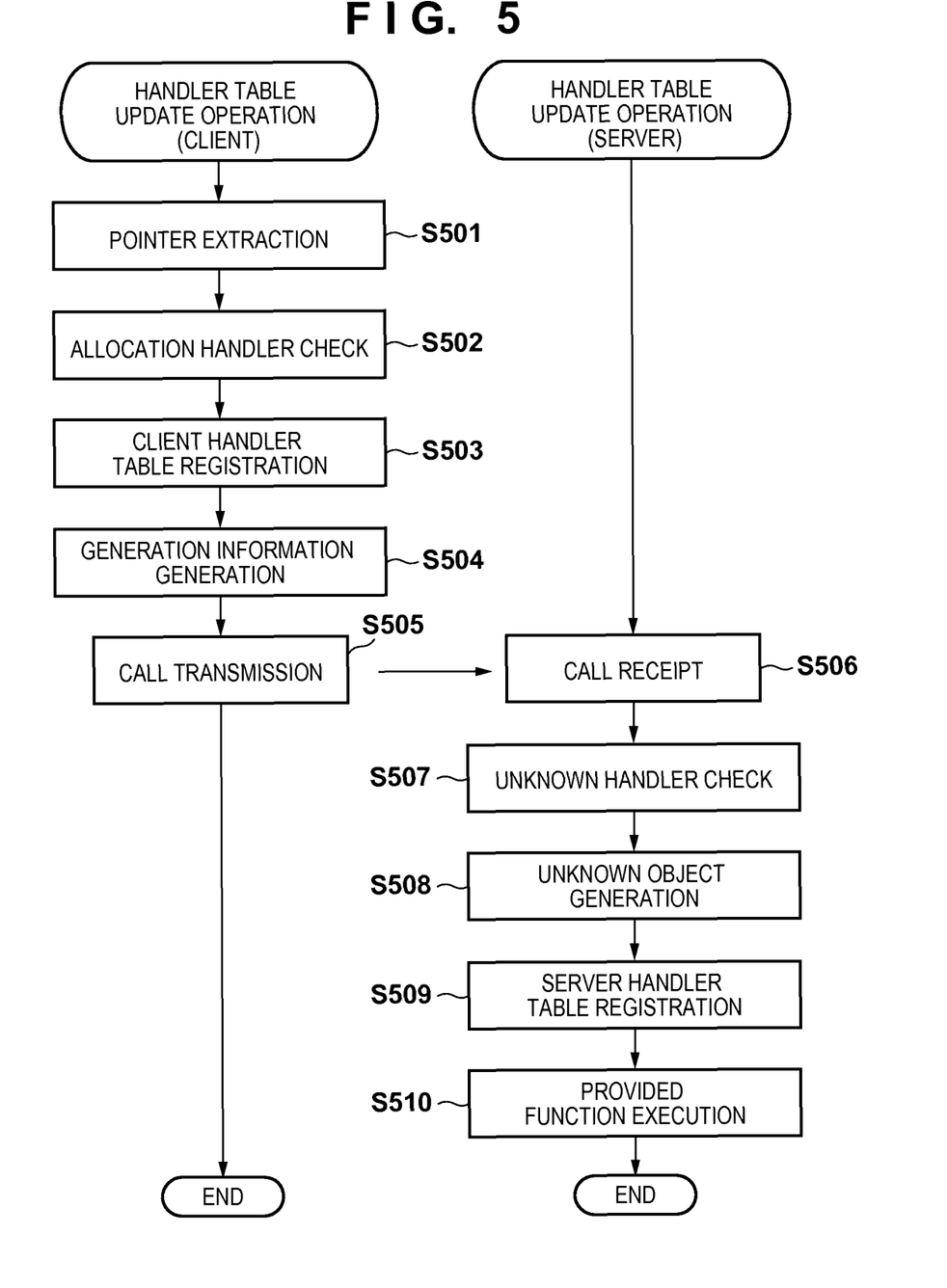
FIG. 5 is an operation flow illustrating an outline of a handler table updating operation according to embodiments of the present invention.

Here an overview of handler table update operation of the previously described client handler table and the server handler table will be explained using the operation flow of FIG. 5. Note, the processing of this operation flow is performed when the control unit 101, in the processing performed on the client terminal 100, determines to generate a call to a provided function that the server 200 provides.

In step S501 the control unit 101 extracts instances included in a call (in other words pointers to objects stored in the RAM 103).

In step S502, the control unit 101 determines, for each pointer extracted in step S501, whether or not a handler has already been allocated referring to the client handler table.

In step S503, the control unit 101 allocates and registers in the client handler table a new handler for pointers for which a handler was not yet allocated.

In step S504, the control unit 101 generates generation information necessary for generating the object for an object specified by a pointer for which a new handler was allocated. As with the present embodiment, in order to reference a single object in different memory spaces, it is necessary to generate the same object in each of the memory spaces. In other words, in order to allow reference of an object generated in the client terminal 100 in the server 200, the control unit 101 may transmit generation information for causing generation in the server 200 of the object, and the server control unit 201 may generate the same object. Note, the generation information may be information to which an allocated handler is associated that generates parameters, processing order and the like necessary for generation of the object, for example.

In step S505, the control unit 101 packages and transmits to the communication unit 105 the handlers allocated for each pointer extracted in step S501 thereby causing them to be transmitted to the server 200 as a call. Here, in a case where a pointer for which a handler was newly allocated exists amongst the extracted pointers, the control unit 101 includes generation information for the pointer in the call.

Note, in the present embodiment explanation is made having transmission done including generation information, but so long as association between the generation information and the call can be distinguished, it should be understood that they can be transmitted separately. Also, in the present embodiment, explanation is made having handler information associated with the generation information, but the invention is not limited to this. For example, in a case where only one handler is included in a call, if it is possible to distinguish an association with the generation information, there is no need for the handler information to be associated with the generation information.

In step S506, the server control unit 201 receives the call sent from the client terminal 100.

In step S507 the server control unit 201 determines whether or not a handler that does not exist in the server handler table (an unknown handler) is included in the received call.

In step S508, the server control unit 201 references generation information included in the call, generates an object corresponding to the unknown handler, and stores it in the server RAM 203.

In step S509, the server control unit 201 associates a pointer to the object generated in step S508 with the unknown handler and registers it to the server handler table.

In step S510, the server control unit 201 executes the provided function that was called. At this point the server control unit 201 references the server handler table, passes as an instance of the provided function a pointer corresponding to the handlers included in the call, and executes.

With this, it is possible to realize an execution instruction due to a call to a function that another device provides between devices having different memory spaces. Also, because specification of a pointer by a handler is possible, it is possible to reduce data communication volume for the call.

Concrete Example

Here, explanation of an operation example of the above described operation flow is given. The case in which a call to the provided function:

InitialisationMethod(Data, &pObject1, &pObject2, &pObject3)

is performed in a case where, for example, not a single handler or pointer is registered in the client handler table is considered.

Figure 6A:
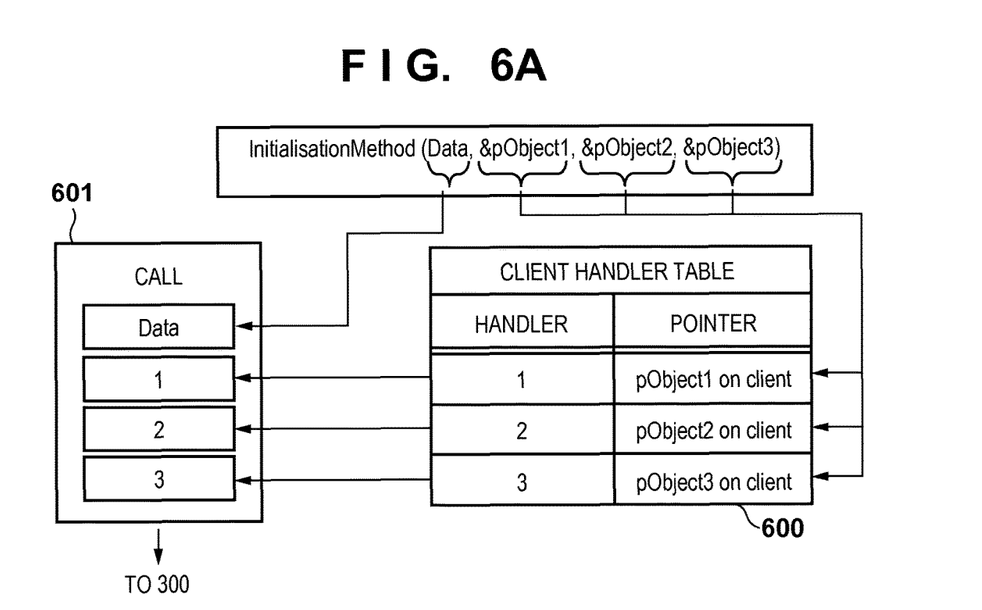
FIGS. 6A and 6B are views for explaining the handler table updating operation according to embodiments of the present invention.

In this case, because handlers are not yet allocated for pointers pObject1, pObject2 or pObject3, the control unit 101 allocates to each pointer and registers in the client handler table 600 a handler, as shown in FIG. 6A. Next, the control unit 101, as a call 601 to the InitialisationMethod function, packages:

Data (including generation information of Object1, Object2 and Object3);

a handler "1" allocated for pObject1;

a handler "2" allocated for pObject2; and a handler "3" allocated for pObject3, and transmits them to the server 200 by transferring them to the communication unit 105.

Figure 6B:
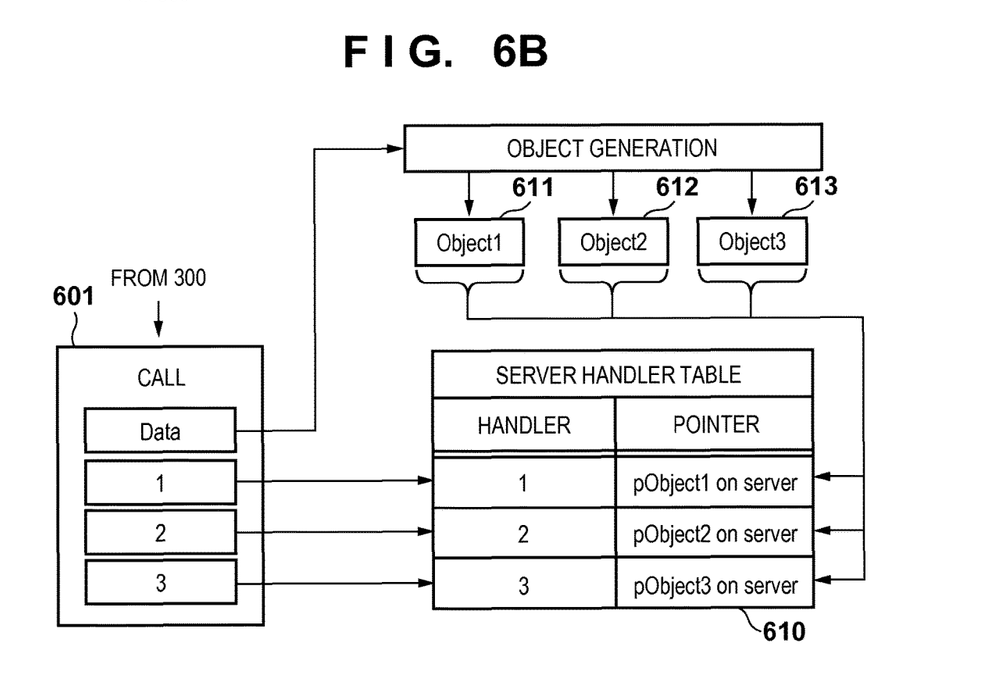

On the other hand, when on the server 200 the call 601 is received, first the server control unit 201 references the generation information included in the call and generates objects 611, 612 and 613 (Object1, Object2 and Object3) which correspond to the handlers in the server RAM 203. Next, the server control unit 201 associates the corresponding handlers to the pointers for the generated objects and registers them this in the server handler table 610.

With this, on top of generating in the server RAM 203 the same objects as Object1, Object2 and Object3 existing in the RAM 103 of the client terminal 100, handlers that are common between each of the client terminals 100 and the server 200 can be allocated. Specifically, after being registered in the handler tables, each of the objects can be specified by the handler alone.

Also, a case in which, in a case where, for example, the client handler table is as in FIG. 6A, a call to a function:

pObject2→FunctionCall(Data, &pObject4)

that defines an operation corresponding to a particular object is performed in considered.

Figure 7A:
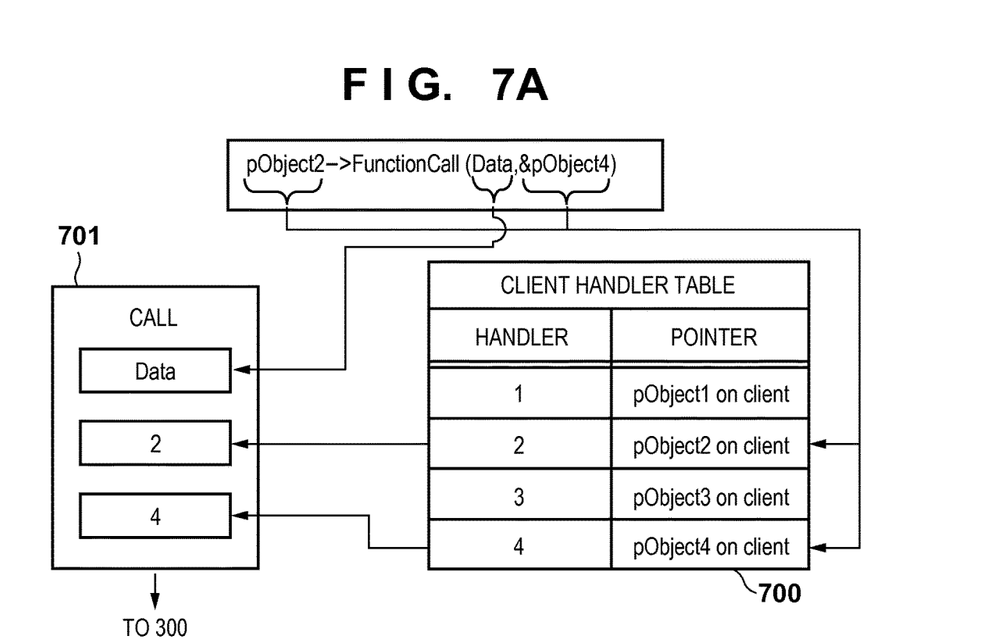
FIGS. 7A and 7B are other views for explaining the handler table updating operation according to embodiments of the present invention.

In this case, because the handler is not yet allocated for the pointer pObject4, the control unit 101 allocates the handler "4" and registers it in the client handler table 700, as shown in FIG. 7A. Next, the control unit 101 as a call 701 to the InitialisationMethod function packages:

Data (including generation information of Object4);

a handler "2" allocated for pObject2; and a handler "4" allocated for pObject4, and transmits them to the server 200 by transferring them to the communication unit 105.

Figure 7B:
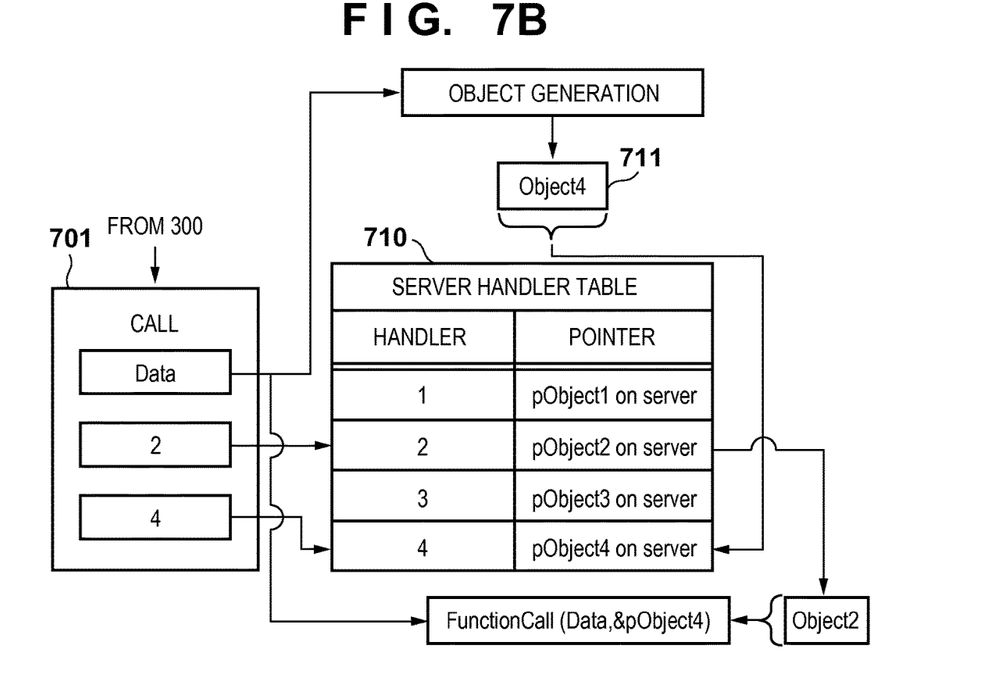

On the other hand, when on the server 200, the call 701 is received, firstly the server control unit 201 references the generation information included in the call and generates an object 711 (Object4) which corresponds to handler "4" in the server RAM 203. Next, the server control unit 201 associates the corresponding handler "4" to the pointer (pObject4 on server 200) for the generated object and registers it in the server handler table 710.

In this way, by updating the data configuration of a call, even a function that defines operation corresponding to a particular object can be associated.

As explained above, the processing system of the present embodiment is able to realize the execution of processing due to a call that spans multiple devices. Specifically, in the processing system, the first device allocates identification information, that is for the processing system, for specification information specifying a storage object in the memory space of the device. Next a call to a function which the second device provides which includes the allocated identification information is generated and transmitted. In this case the first device generates generation information in order to generate an object corresponding to the identification information included in the generated call, associates it with the call, and transmits it. Meanwhile, in a case where unknown identification information is included in the received call, the second device generates and stores an object corresponding to unknown identification information based on generation information associated with the call. Next, the second device associates unknown identification information with specification information that specifies a stored object in the memory space of the device and registers it.

Second Embodiment

In the above described first embodiment, explanation was given for an example in which a single client terminal 100 is connected to a server 200. In the present embodiment, an example in which, for example, game content that the server 200 provides is an online game of a type in which multiple people can simultaneously participate, and in which multiple client terminals 100 are connected to the server 200 will be explained.

Note, in the present embodiment, explanation will be given having the server 200 be something that provides an online game of a type in which multiple people can simultaneously participate, but the present invention is not limited to content in which a plurality of users can simultaneously participate in a single game space in this way. The invention according to the present can be adopted to a case in which calls made from a plurality of client terminals handlers for common objects are included.

In a case where, as with an online game of a type in which multiple people can simultaneously participate, game content is provided to a plurality of client terminals, it is possible that common objects are used in rendering processing of such things as screens that are provided to the client terminals, and characters, terrain and the like that are included in screens. In this case, even if the object is the same, a different handler is allocated for each client terminal and managed, in a case where as in the first embodiment a handler table is allocated and managed for each client terminal. In other words, in the memory space of the server 200, the same object will be generated multiple times, and furthermore, a different handler will be allocated for each instance, and managing handler tables will exist for each. This leads to unnecessary memory space occupation due to multiple occurrences in the memory space of the server 200 for what is in fact only a single object, and so this is undesirable.

In the present embodiment, in view of this kind of problem, in a system in which execution of processing due to a call over multiple devices being performed, a game system that realizes better memory usage efficiency is provided.

<Game System Configuration>

Figure 1B:
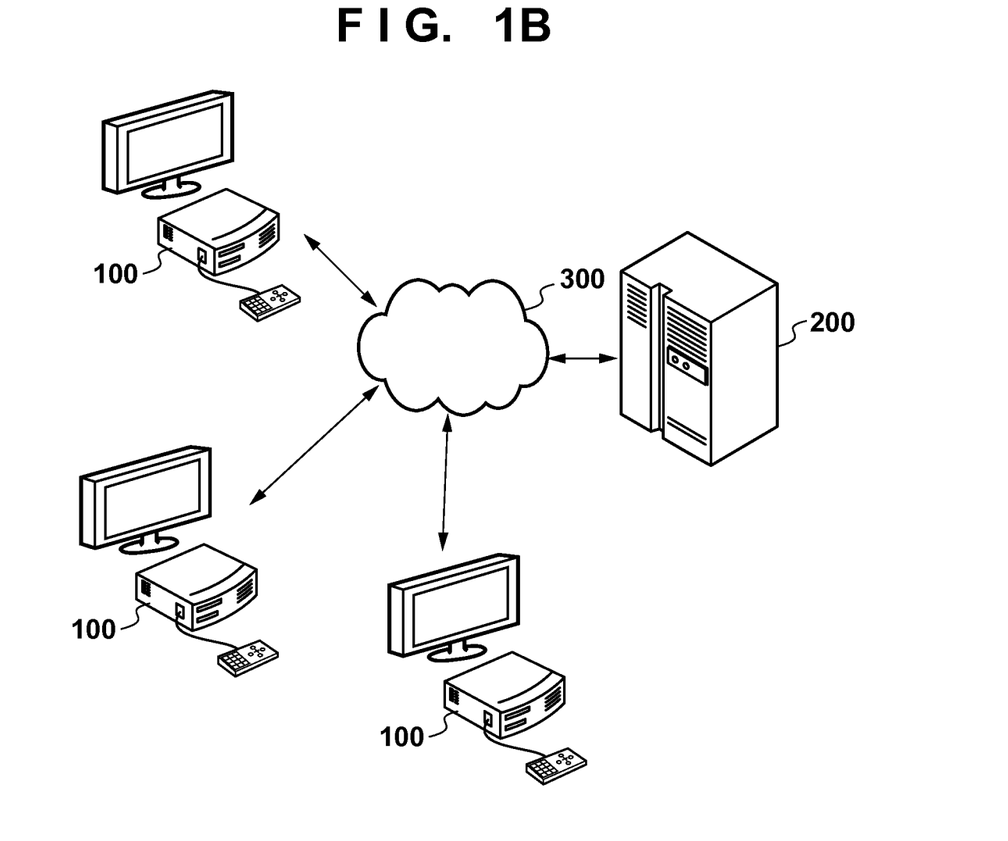
FIG. 1B is view for showing a system configuration of a game system according to a second embodiment of the present invention.

FIG. 1B shows the system configuration of the game system of the present embodiment. As shown in the drawing, a plurality of client terminals 100 are connected to the server 200 via the network 300. Note, in the game system of the present embodiment, because the functional configuration of the client terminal 100 and the server 200 is common to that of the first embodiment other than the fact that the communication unit 105 of the client terminal 100 performs communication with other client terminals 100, explanation is omitted.

In the client terminal 100 of the present embodiment, in a case where a pointer for which a handler is not yet allocated is included in a call to a function provided by the server 200, the following processing is performed. The control unit 101 transmits, as handler allocation information, information indicating a newly allocated handler for a pointer for which a handler is not yet allocated and generation information for an object indicating the pointer to not only the server 200 but also to other client terminals 100 that are connected to the server 200. In other words, by transmitting the object for which the handler was newly allocated and information of the handler to the other client terminals 100, it is possible to synchronize the client handler tables between the client terminals.

In the present embodiment, client handler tables are synchronized between client terminals in this way, and each terminal is made to hold a common handler table. By doing this, because it eliminates the same object being multiply generated in the server RAM 203 of the server 200 and furthermore because it eliminates the necessity of the server 200 having server handler tables for each terminal, it makes for efficient memory usage.

<Client Handler Table Update Processing>

Figure 8:
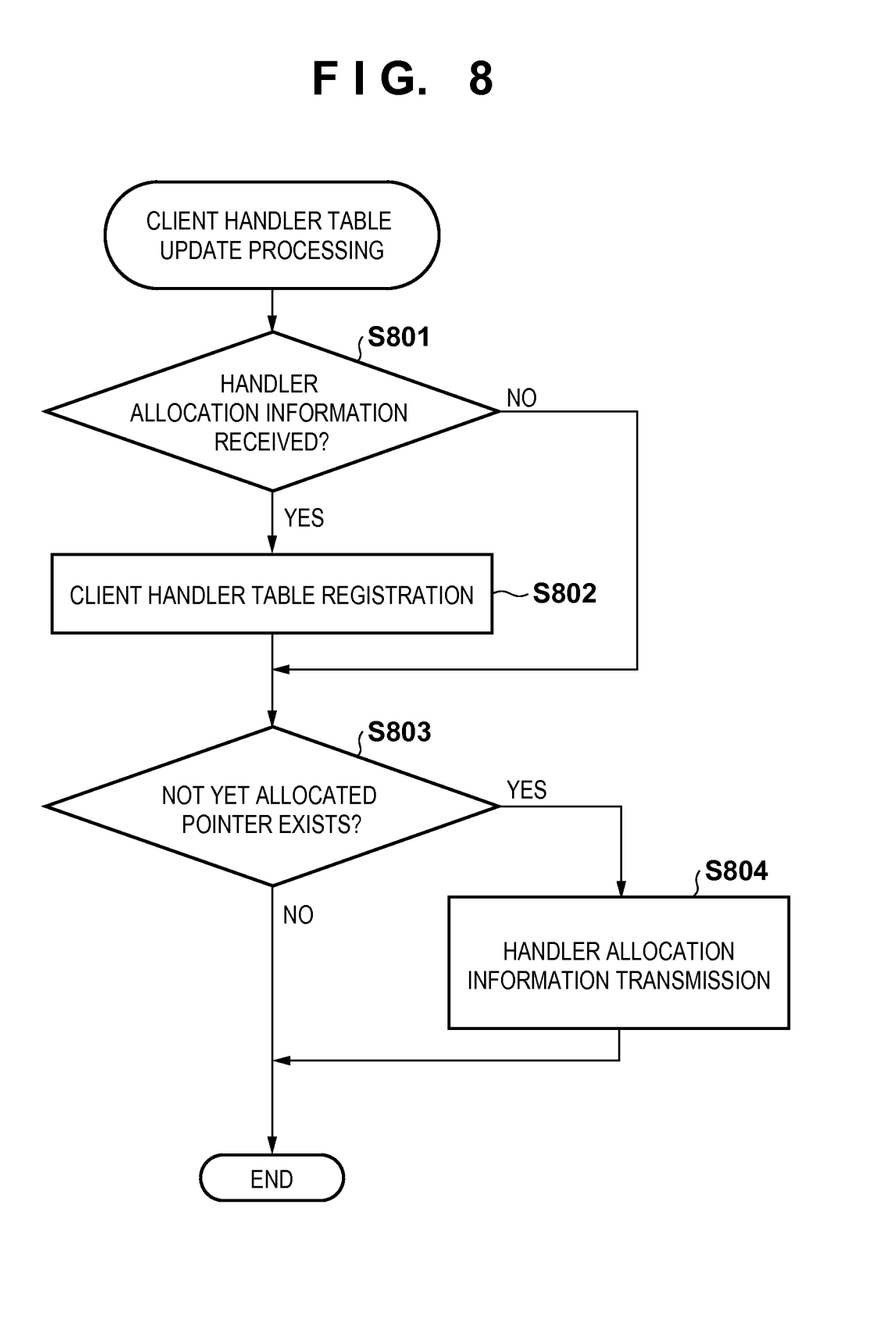
FIG. 8 is a flowchart for illustrating client handler table updating operation executed on the client terminal 100 according to the second embodiment of the present invention.

Here, client handler table update processing executed on the client terminal 100 according to the present embodiment will be explained in detail using the flowchart of FIG. 8. The processing corresponding to this flowchart can be realized by the control unit 101 reading out a corresponding processing program stored in the ROM 102 for example, loading it into the RAM 103 and executing it. Note, explanation will be given with this client handler table update processing being initiated when an application for, for example, game content is executed, and being repeatedly executed in a processing loop corresponding to a single frame in the application.

In step S801, the control unit 101 determines whether or not the communication unit 105 received handler allocation information indicating that a handler was allocated for a new object from another client terminal 100. In a case where the control unit 101 determined that the communication unit 105 received handler allocation information from another client terminal 100, it moves the processing to step S802, and in a case where it determined that the communication unit 105 did not receive handler allocation information from another client terminal 100, it moves the processing to step S803.

In step S802, the control unit 101 generates a new object in the RAM 103 based on generation information included in the handler allocation information, associates the handler specified in the handler allocation information with the pointer to the object, and registers this in the client handler table.

In step S803, the control unit 101 determines whether or not a pointer for which a handler has yet to be allocated exists in the pointers included in the call transmitted to the server 200 in the processing of the current frame. In a case where the control unit 101 determined that a pointer for which a handler has yet to be allocated exists in the pointers included in the call transmitted to the server, it moves the processing to step S804, and in a case where the control unit 101 determined that a pointer for which a handler has yet to be allocated does not exist in the pointers included in the call transmitted to the server, it terminates this client handler table update processing.

In step S804, the control unit 101 transmits, as handler allocation information, to other client terminals 100 that are connected to the server 200, by transferring information indicating the handler allocated for the pointer for which a handler was not yet allocated, and generation information of the object that the pointer indicates to the communication unit 105, and terminates this client handler table update processing.

With this, it is possible to generate a call to a function provided by the server 200 using a handle common to all of the client terminals connected to the server 200. Note, explanation was given having handler information allocated for an object be something that was shared by all of the client terminals connected to the server 200, but working of the present invention is not limited to this. For the present invention, handler information may be shared amongst only some client terminals out of the client terminals connected to the server 200 such as, for example, a group of client terminals for which the operation character is located in a specific field in the game, or for a group of client terminals for which the users are performing cooperative play in the game.

Third Embodiment

In the second embodiment described above, an embodiment in which when a plurality of client terminals 100 are connected to the server 200, client handler tables are synchronized between client terminals, and used was explained. In the present embodiment, explanation of an embodiment whereby synchronization of the client handler table between client terminals is unnecessary will be given.

<Game System Configuration>

Figure 9:
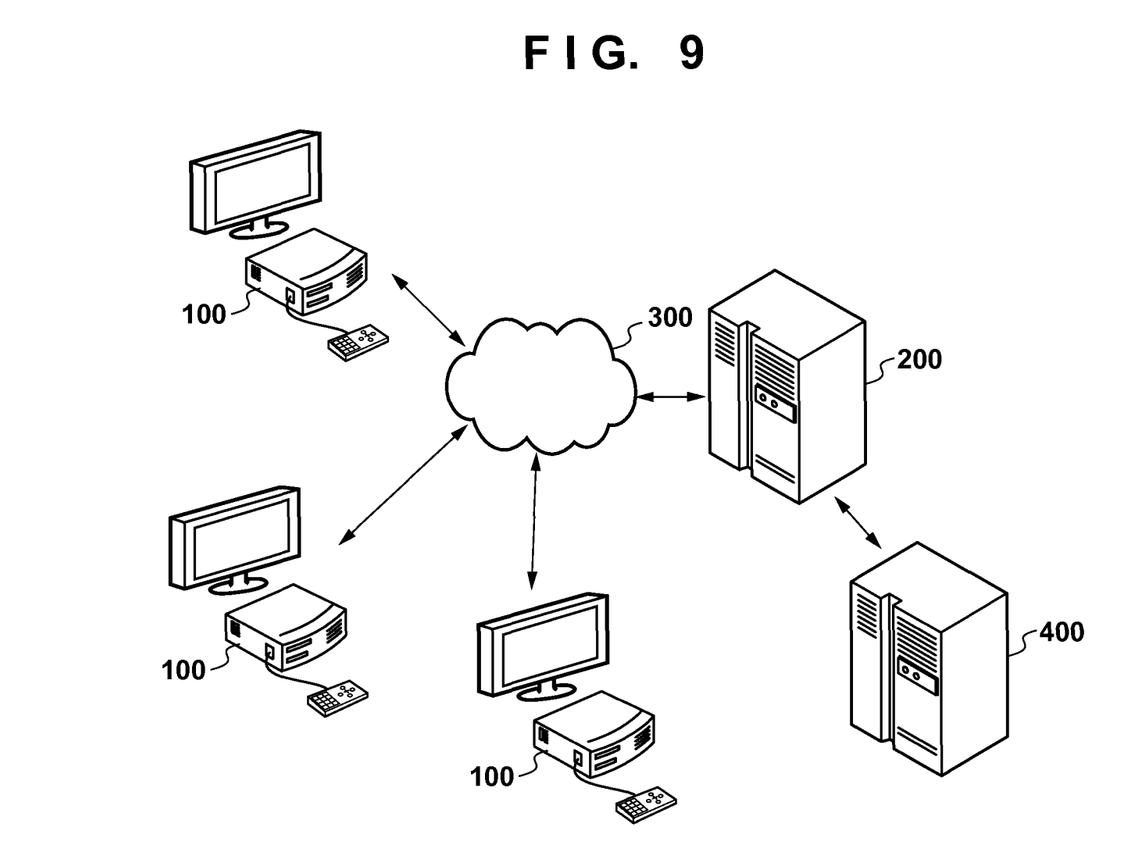
FIG. 9 is view for showing a system configuration of a game system according to a second embodiment of the present invention.

FIG. 9 shows the system configuration of the game system of the present embodiment. In the game system of the present embodiment, on the point that a plurality of client terminals 100 are connected to the server 200 via the network 300, this embodiment is the same as the second embodiment. In the present embodiment, the server 200 is further connected to a rendering server 400. In the example of FIG. 9, the server 200 and the rendering server 400 are shown to be directly connected. However, it should be easy to envision that the server 200 and the rendering server 400 may be connected via a network 300.

Note, in the game system of the present embodiment, the processing that the client terminal 100, the server 200, and the rendering server 400 handle differs from that of the two embodiments described above. In the present embodiment, in contrast to the above described embodiments, the rendering server 400 executes processing concerning the game content rendering system that is performed in the server 200. Also, the server 200 generates a call to a function provided by the rendering server 400, thereby causing the rendering server 400 to perform the processing. In other words, in the present embodiment, there is no need to perform specific processing of game content such as rendering instructions in the client terminal 100. The client terminal 100 performs playback of encoded video data received from the server 200. Also, the client terminal 100 associates user operation input related to the game content, and transmits this operation input to the server 200.

In other words, in the game system of the present embodiment, the client terminal 100 only needs an operation input interface with the application that performs playback of the encoded video data provided from the server 200 such as a browser, for example, and does not need to save or execute a particular game program. The specific processing for game content is performed by the server 200 and out of that, for processing concerning the rendering system, the server 200 causes the rendering server 400 to execute the processing by transmitting a call to it. Of course the handler table update operation explained in the embodiments described above is performed by the server 200 and the rendering server 400, and the server 200 manages a table corresponding to the client handler table, and the rendering server 400 manages a table corresponding to a server handler table.

In the game system of the present embodiment, the specific processing for each of the plurality of client terminals 100, is executed in the server 200. In this case, the server control unit 201 does not need to manage a table corresponding to the client handler table for processing of each client terminal, but rather only needs to manage a single table and generation information for each object for the plurality of client terminals. In other words, by using a common table in the same memory space for the processing of the plurality of client terminals, it is possible to share handler information allocated for a new object processing of one of them without performing the client handler table update processing described above.

By doing this, it is possible to generate a call to a function provided by the rendering server 400 using a common handler in the processing for the plurality of client terminals that are connected to the server 200 in the same was as in the second embodiment described above. Note, in this case, because the object that the processing for the plurality of client terminals references exists in the same memory space in the server 200, there is no need to newly generate, based on generation information, or store an object. When the server control unit 201 needs to newly generate an object, it references generation information for previously generated objects in the memory space, and in the case where a match exists, the previously generated object may be used without the necessity of generating the object.

Note, in the first and second embodiments described above, and the in the third embodiment, explanation was given wherein the handler allocated for the pointer was included in the call, but the present invention is not limited to this. The present invention eliminates not obtaining a desirable result by including an address reference to the object in the call in order that the same object be stored in a different address in a memory space of a different device In other words, the target of allocation of identification information such as the handler, is not limited to a pointer, and may be specifying information that specifies a particular address in a memory space.

OTHER EMBODIMENTS

Also, the processing system according to the present invention can be realized by a program that causes a computer to function as each of the devices in the processing system. This program can be provided/distributed via an electronic communication circuit by storing it in a computer readable storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of U.S. Patent Provisional Application No. 61/661,499, filed Jun. 19, 2012, U.S. Patent Provisional Application No. 61/664,313, filed Jun. 26, 2012, and Japanese Patent Application No. 2012-183575, filed Aug. 22, 2012, which are hereby incorporated by reference herein in their entirety.

The invention claimed is:

1. A processing system in which a first device generates a call corresponding to a function provided by a second device which is different from the first device, and causes the second device to execute processing corresponding to the function,
wherein the first device comprises:
a first memory configured to store a first object;
an allocator configured to allocate a first handler that specifies a first memory space address of the first object stored in the first memory;
a call transmitter configured to generate and transmit to the second device a call including the first handler allocated by the allocator; and
an information transmitter configured to generate and transmit, to the second device, generation information associated with the call for generating, in the second device, a second object corresponding to a second handler included in the call, the first object and the second object storing same data,
wherein the second device comprises:
a second memory;
a receiver configured to receive the call or the generation information transmitted by the first device; and
a registrator configured to, in a case where the second handler unknown to the second device is included in the received call,
generate the second object corresponding to the second handler based on the generation information associated with the received call, the second object not yet in existence in the second device prior to the generation, and
associate a second memory space address for the second object and the second handler,
store the second object in the second memory space address in the second memory, and
register, the second handler that specifies the second memory space address of the second object stored in the second memory,
wherein the first memory space address and the second memory space address are different from one another.

2. The processing system according to claim 1, wherein, in a case where an object for which a handler is newly allocated for a memory space address of the first memory exists among objects corresponding to a handler included in the call, the information transmitter generates and transmits, to the second device, the generation information of the object for which the handler is newly allocated.

3. The processing system according to claim 1, wherein the second device is connected with a plurality of first devices for communication, and the first device further comprises a communication circuit configured to associate with a handler included in the call, and share with another first device among the plurality of first devices, generation information of an object corresponding to the handler included in the call.

4. The processing system according to claim 1, wherein the first device is connected to a plurality of third devices for communication, and independently executes processing that includes generating of a call corresponding to a function that the second device provides to each of the plurality of third devices, and the first device further comprises a communication circuit configured to associate with a handler included in the call generated in the independently executed processing, and share with other independently executed processing, generation information of an object corresponding to the handler.

5. The processing system according to claim 1, wherein the second device further comprises a processor configured to execute processing corresponding to a called function using a memory space address associated with a handler included in a call received by the receiver.

6. The processing system according to claim 1, wherein a memory space address specifies a pointer for an object stored in the first memory or the second memory, a handler is allocated for the memory space address, and the second device further comprises a processor configured to execute processing corresponding to the called function using a pointer associated with a handler included in the call received by the receiver.

7. The processing system according to claim 3, wherein the allocator, in a case where an unknown handler is shared from the other first device by the communication circuit, generates, based on generation information associated with the unknown handler, and stores in the first memory, an object corresponding to the unknown handler, and allocates the unknown handler for specifying a memory space address of an object corresponding to the unknown handler.

8. An information processing apparatus that executes processing corresponding to the function in accordance with having received a call for a function that the information processing apparatus provides from another device, the information processing apparatus comprising:
a memory;
a receiver configured to receive, from the other device, a call including a first handler allocated to specify a first memory space address of a first object stored in the other device, and generation information for generating, in the information processing apparatus, a second object corresponding to a second handler included in the call, the first object and the second object storing same data; and
a registrator configured to, in a case where the second handler unknown to the information processing apparatus is included in the call received by the receiver,
generate the second object corresponding to the second handler based on the generation information, the second object not yet in existence in the second device prior to the generation,
associate a second memory space address in the memory for the second object and the second handler,
store, in the memory, the second object in the second memory space address, and
register, the second handler that specifies the second memory space address of the second object stored in the memory,
wherein the first memory space address and the second memory space address are different from one another.

9. A control method of an information processing apparatus that executes processing corresponding to a function that the information processing apparatus provides in accordance with having received a call for the function from another device, the control method comprising:

receiving from the other device, a call including a first handler allocated to specify a first memory space address of a first object stored in the other device, and generation information for generating, in the information processing apparatus, a second object corresponding to a second handler included in the call, the first object and the second object storing same data; and in a case where the second handler unknown to the information processing apparatus is included in the call received in the receiving, generating the second object corresponding to the second handler based on the generation information, the second object not yet in existence in the second device prior to the generation, associating a second memory space address in a memory of the information processing apparatus for the second object and the second handler, storing, in the memory, the second object in the second memory space address, and registering, the second handler that specifies the second memory space address of the second object stored in the memory, wherein the first memory space address and the second memory space address are different from one another.

10. A non-transitory computer-readable storage medium storing a program for causing a computer to execute the control method of the information processing apparatus according to claim 9.

* * * * *